United States Patent
Borg (10) Patent No.: US 8,350,869 B1
(45) Date of Patent: Jan. 8, 2013

(54) PREVIEW FOR COLORBLIND

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1059 days.

(21) Appl. No.: 12/059,659

(22) Filed: Mar. 31, 2008

(51) Int. Cl.
*G09G 5/02* (2006.01)
*G06K 9/00* (2006.01)

(52) U.S. Cl. .................. 345/603; 345/589; 382/167

(58) Field of Classification Search ............ 345/589
See application file for complete search history.

(56) References Cited

U.S. PATENT DOCUMENTS

| | | | | |
|---|---|---|---|---|
| 6,094,454 | A * | 7/2000 | Mitchell et al. | 375/240.18 |
| 2008/0012875 | A1* | 1/2008 | Newman | 345/589 |
| 2008/0075364 | A1* | 3/2008 | Speigle et al. | 382/167 |
| 2009/0116044 | A1* | 5/2009 | Platt et al. | 358/1.9 |

OTHER PUBLICATIONS

"CHIRI" CHIRI Geographic Information Service Co., Ltd., http://209.85.135.104/translate_c?hl=en&u=http://www.chiri.com . . . , 4 pages, 2007.

Hu, "Visual Simulating Dichromatic Vision in CIE Space" School of Computer Science, University of Central Florida, 6 pages, Dec. 2005.
Capilla et al., "Corresponding-pair procedure: a new approach to simulation of dichromatic color perception" J. Opt. Soc. Am. A, vol. 21, No. 2, pp. 176-186, Feb. 2004.
"About Vischeck" http://www.vischeck.com/vischeck, 2 pages, May 2, 2002.
Brettel et al., "Computerized simulation of color appearance for dichromats" J. Opt. Soc. Am. A, vol. 14, No. 10, pp. 2647-2655, Oct. 1997.
Wyszecki et al., "Color Science" pp. 463-471, 1982.
Judd, "Color Perceptions of Deuteranopic and Protanopic Observers" Journal of Research of the National Bureau of Standards, Research Paper RP1922, vol. 41, pp. 247-271, Oct. 1948.
"Color Vision Deficiency Simulation Monitors" EIZO, http://www.eizo.com/products/lcd/color_vision/about01.asp, 2 pages, Jan. 30, 2008.
"Visolve—the assistive software for people with color blindness," downloaded via Internet Archive Wayback Machine, Copyright 2004-2006 by Ryobi System Solutions, 26 pages.

* cited by examiner

*Primary Examiner* — Kee M Tung
*Assistant Examiner* — Sing-Wai Wu
(74) *Attorney, Agent, or Firm* — Robert C. Kowert; Meyertons, Hood, Kivlin, Kowert & Goetzel, P.C.

(57) ABSTRACT

The subject matter disclosed herein relates to previewing documents for colorblind end users.

25 Claims, 4 Drawing Sheets

PREVIEW FOR COLORBLIND

BACKGROUND

Colorblind persons have an inability to perceive differences between some of the colors that other people can distinguish. For example, persons with normal color vision may have three types of cone cells within their retinas, and may be referred to as trichromats. Colorblind persons, on the other hand, may have only two types of cone cells within their retinas, and may be referred to as dichromats.

It may not be trivial for persons with normal vision (trichromats) to design visuals that are equally suitable for colorblind as well as non-colorblind viewers. For example, if a trichromatic user were to design a visual, such as a subway map, such a map might be illustrated with a green route and a red route. While such a green route and a red route might be useful for a trichromatic user, they may be less than helpful to a dichromatic user in differentiating between the two routes. More specifically, for a dichromatic user with a red-green-type colorblindness, such a green route and a red route might appear to be substantially of the same color.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Many devices represent colors of image elements to users for a variety of purposes. These purposes may include representing colors of image elements by a device on a display and/or in print. If a given device represents colors to a user, the device may employ a color space to define each displayed and/or printed color numerically. The color space of a given device defines the total range of colors reproducible by that device. The color space of a given device may not encompass all possible colors, and is, therefore, only a subset of all possible colors. As the color space of a given device may be only a subset of all possible colors, different types of devices, different device models, and/or different manufactures may use varying color spaces.

It may be challenging to accurately represent each displayed and/or printed color numerically as color data in the device color space, so that the colors appear accurate to the eye of a user. For example, the transfer of color data from one device color space to another device color space may result in inaccurate color representation if the color spaces of the devices are not the same.

Color management may be used to facilitate the transfer of color data from one device color space to another different device color space. In the following description and/or claims, the term "color management" as referred to herein, relates to the management of the transfer of color data from one device color space to another different device color space.

Color management may be performed via a color management system (CMS), which may be used to reduce or eliminate color space matching problems and makes color portable. A CMS may reconcile the different color capabilities of scanners, display monitors, and/or printers to ensure consistent color throughout the transfer of color data between and/or among various devices. For example, the colors displayed on a display monitor may be accurately transferred to a printer. Similarly, color management may permit different applications, devices, and/or operating systems to display colors consistently. For example, the color space of a given device defines the total range of colors reproducible by that device. A color space of a given device may not encompass all possible colors, and is therefore, only a subset of all possible colors. As the color space of a given device may be only a subset of all possible colors, different types of devices (such as printers, displays, scanners, or the like), different device models, and/or different manufactures may use varying color spaces. For example, color management may translate color data from one device color space to another different device color space by using device-type profiles and a device independent color space. Color spaces may include, but are not limited to, the following: sRGB, Adobe® RGB and Adobe® Wide Gamut RGB, CMYK, CIE 1931 XYZ, CIELUV, CIELAB, CIE 1964, or the like. The device independent color space may provide a device independent reference for translating color data from one device-type profile to another different device-type profile. Each device-type profile may define the color characteristics of the given device to allow for a translation between a first device color space into the device independent color space via a first device-type profile, and from the device independent color space into a second device color space via a second device-type profile. Accordingly, there may be a first transform to allow for a translation between a first device color space into the device independent color space via a first device-type profile, and there may be a second transform from the device independent color space into a second device color space via a second device-type profile. Alternatively, it is not required to convert color data to and from an intermediate color space. For example, a translation between a first device color space into a second device color space may instead be accomplished by combining the two transforms into one. However, these are merely examples of translations between color spaces, and the scope of claimed subject matter is not limited in this respect.

Embodiments described herein relate to, among other things, previewing documents for colorblind end users. In one particular embodiment, although claimed subject matter is not limited in this respect, color management operations may be used to facilitate the previewing documents for colorblind end users. A procedure for adapting color management operations to facilitate the previewing documents for colorblind end users will be described in greater detail below. For example, one or more profiles utilized in color management operations may be adapted to incorporate a simulation transform capable of simulating the appearance of a color image to a colorblind person to a trichromatic user. Once such a profile is adapted with such a simulation transform, simulating the appearance of a color image to a colorblind person with respect to a document may be performed at a nearly instantaneous speed. Additionally, due to the speed of the simulation, a document being simulated may be edited in a preview mode. Further, once such a profile is adapted with such a simulation transform, the profile may be associated with existing products that utilize color management operations in order to facilitate previewing of documents for colorblind end users.

Figure 1:
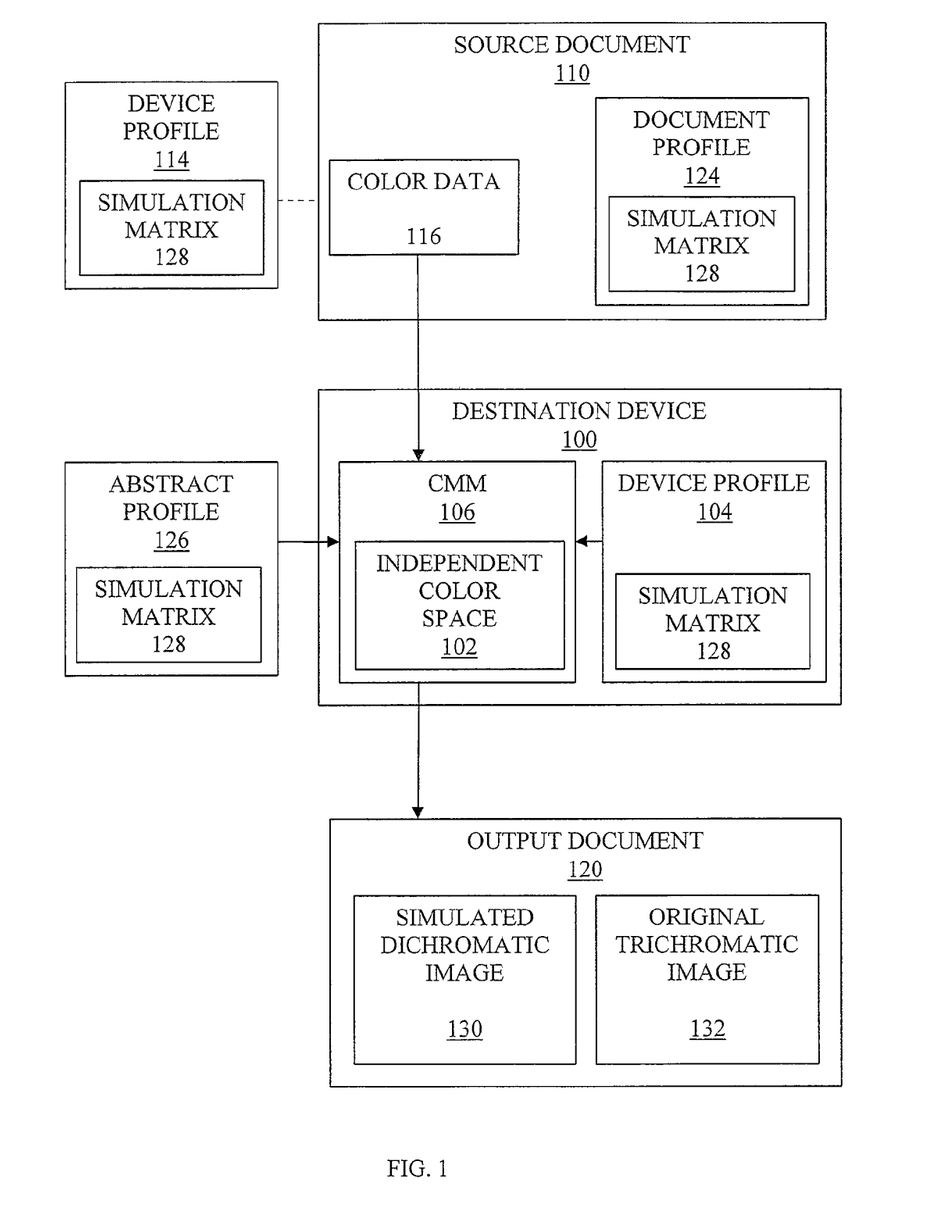
FIG. 1 is a schematic diagram illustrating a translation of image elements from a source document to an output document in accordance with one or more embodiments.

Referring to FIG. 1, a schematic diagram illustrates a translation of image elements from a source document to an output document in accordance with one or more embodiments. A destination device 100 may employ a color management system having three major components: a device-independent color space 102 that acts as a common reference for translating between different color spaces, device-type profiles 104 that define the color characteristics of one or more particular devices, and a Color Management Module (CMM) 106 that interprets the device-type profiles and carries out the translation of color data from one device color space to another different device color space.

The term "profile" as used herein may comprise a tool for describing the color attributes of a particular device, particular document, particular effect, and/or the like. For example, a device-type profile may define the color characteristics of a given device to allow for a translation between a first device color space into the device independent color space via a first device-type profile, and/or from a device independent color space into a second device color space via a second device-type profile. Device-type profiles may include monitor profiles, input device profiles, and/or output device profiles, and/or the like. Monitor profiles may describe how a given display monitor may reproduce color. Input device profiles may describe color space of input devices like scanners, cameras, and/or the like. Input device profiles may describe what colors an input device may be capable of capturing and/or scanning. Output device profiles may describe color space of output devices like desktop printers or a printing press. Output device profiles may describe what colors an output device may be capable of presenting, printing, displaying, and/or the like.

Color management operations may translate color data from one device color space to another different device color space by the CMM 106 using various device-type profiles 104 and device independent color space 102. Each device-type profile 104 may define the color characteristics of the given device to allow for a translation between a first device color space into the device independent color space 102 via a first device-type profile, and from the device independent color space 102 into a second device color space via a second device-type profile. Accordingly, the device independent color space 102 may provide a device independent reference for translating color data from one device-type profile to another different device-type profile.

In the following description and/or claims, the term "document" as referred to herein relates to an object and/or information that is organized and/or formatted in a digitized form for printing or for displaying, such as in a graphical user interface. For example, a document may be organized and/or formatted in a digitized form comprising one or more of the following formats: JPEG, TIFF, PDF, PSD, and/or the like, or combinations thereof. However, these are merely examples of document formats, and the scope of claimed subject matter is not limited in this respect.

A color managed source document 110 may include an associated device-type profile 114 in addition to its color data 116. For example, the associated device-type profile 114 may be embedded. Embedded device-type profiles 114 allow users to transparently move a color managed source document 110 between different computers, networks and even operating systems without having to maintain or install the necessary device-type profiles 114 on the destination device. Additionally or alternatively, the source document 110 may be associated with one of the device-type profiles 104 located on the destination device 100 through the CMM 106. For example, the CMM 106 may take a source document 110 and translate color data 116 from the source device color space to the destination device 100 color space via the device-type profile 104 and device-type profile 114. Color managed color data 116 from source document 110 may be provided as a color managed output document 120 to be presented with colors consistent with the intended color rendering.

As discussed above, it may not be readily apparent to a trichromatic user that the color data of a particular source document 110 is appropriately designed for colorblind end users. In some cases, a device-type profile 104 and/or 114 may be altered to facilitate adaptation and/or design for colorblind end users. For example, a Red-Green-Blue (RGB) device-type profile may be modified to permute the output document 120 to appear in dichromatic fashion. If using such a modified device-type profile 104 and/or 114, the color of the displayed and/or printed output document 120 may appear altered to a trichromatic user in order to simulate how a dichromatic end user might perceive color data 116 of source document 110. As a result, a trichromatic user may alter and/or design source document 110 to facilitate a dichromatic user in differentiating between various colors that may appear in an unaltered resultant product.

Additionally or alternatively, as discussed above, a profile used in color management may comprise a tool for describing the color attributes of a particular document. For example, a document-type profile 124 may define a specific color space of source document 110. By assigning and/or tagging source document 110 with document-type profile 124, a definition may be provided of actual color appearances in source document 110, such as by specifying an actual color or wavelength of light, for example. Multiple document-type profiles 124 may be assigned and/or tagged to source document 110 in instances where source document 110 comprises a compound document.

Additionally or alternatively, as discussed above, a profile used in color management may comprise a tool for describing the color attributes of particular effects. For example, an abstract-type profile 126 may apply an effect during a conversion from a document independent color space to a document independent color space. For example, abstract-type profile 126 may allow for modification of color data 116 within document independent color space 102. Adjusted saturation, gray effects, sepia effects, and/or the like are just a few examples of modification of color data 116 that may occur within color management module 106 utilizing abstract-type profile 126.

As will be described in greater detail below, in one particular example, although claimed subject matter is not limited in this respect, a simulation transform 128 may be determined for use in simulating the appearance of a color image to a colorblind person. Such a simulation transform 128 may be incorporated into device-type profile 104 associated with destination device 100, incorporated into device-type profile 114 associated with source document 110, incorporated into document-type profile 124 associated with source document 110, incorporated into abstract-type profile 126, and/or the like. The term "transform" as used herein may comprise a format for arranging and/or organizing data, such as for example, a multi-dimensional table, a multi-dimensional matrix, a multi-dimensional array, and/or the like. The term "simulation transform" as referred to herein relates to a transform including a set of correction values that may be used to translate color data 116 from initial tristimulus color values to resultant tristimulus color values, wherein the resultant tristimulus color values are capable of simulating the appearance of a color image to a colorblind person. For example, such a "simulation transform" as referred to herein may comprise a set of correction values arranged and/or organized as a multi-dimensional table, a multi-dimensional matrix, a multi-dimensional array, and/or the like. Such initial tristimulus color values may be trichromatic in appearance as well as providing three color channels of information. Conversely, such resultant tristimulus color values may be dichromatic in appearance while still providing three color channels of information. Such resultant tristimulus color values may be utilized by destination device 100 to simulate a dichromatic appearance of color data 116 for presentment in output document 120.

Figure 2:
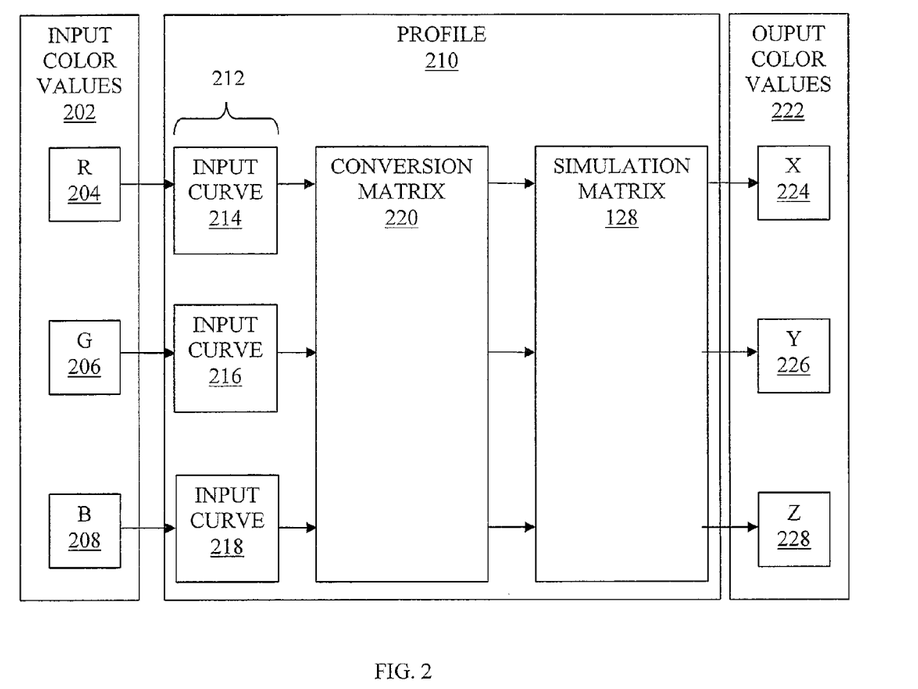
FIG. 2 is a schematic diagram illustrating a translation of data from input color values to output color values in accordance with one or more embodiments.

Referring to FIG. 2, a schematic diagram illustrates a translation of data from input color values to output color values in accordance with one or more embodiments. Input color values 202 may be extracted from color data 116 of source document 110. Such input color values 202 may include input color values for multiple color channels. For example, if the input color values 202 are expressed in RGB (Red, Green, and Blue) source color space, the input color values 202 may comprise tristimulus color values including an R-channel 204, a G-channel 206, and a B-channel 208. Alternatively, other examples of color channels for the input color values 202 may include L*a*b* (luminance, red/blue chrominance and yellow/blue chrominance), and/or the like. Additionally or alternatively, color data 116 of source document 110 may be subject to processing and/or conversion prior to use as input color values 202. For example, if color data 116 of source document 110 is expressed in CMYK (Cyan, Magenta, Yellow and Black) source color space, input color values 202 may be extracted from color data 116 of source document 110 and preliminarily converted from four color channels into three color channels comprising tristimulus color values. The color management of input color values 202 may comprise a transfer of input color values 202 from a source color space to a destination color space in a color conversion process. The color space of destination device 100 may define a total range of colors reproducible by that device. However, the color space of source document may not be identical to that of destination device, and may define a different total range of colors.

Profile 210 may define the color characteristics of source document 110 to allow for a translation of input color values 202 from a device dependent color space into a device independent color space. Alternatively, it is not required to convert input color values 202 to and from an intermediate color space. For example, a translation between a source device color space into a destination device color space may instead be accomplished by combining the transforms into one. However, these are merely examples of translations between color spaces, and the scope of claimed subject matter is not limited in this respect.

Input linearization curves 212 may be included in device-type profile 210 for use in a color conversion. Individual input linearization curves 212 may be assigned to one or more of the channels for input color values 204, 206, and/or 208. For example, if the input color values 202 are expressed in RGB source color space (as illustrated), the input linearization curves 212 may include an R-channel input shaper curve 214, a G-channel input shaper curve 216, and a B-channel input shaper curve 218. Alternatively, if the source color space is L*a*b* (luminance, red/blue chrominance and yellow/blue chrominance) the input color values 202 may include an L-channel input shaper curve, an a-channel input shaper curve, and/or a b-channel input shaper curve, for example. Input color values 202 may be applied to input linearization curves 212 prior to conversion transform 220. Input linearization curves 212 may operate to linearize generally non-linear device characteristics such as luminance, dot gain, and/or the like.

Conversion transform 220 may be included in profile 210 for use in a color conversion. The term "conversion transform" as referred to herein relates to a transform including a set of correction values capable of transforming input color values as expressed in a source color space into output color values as expressed in an intermediate or destination color space. For example, such a "conversion transform" as referred to herein may comprise a set of correction values arranged and/or organized as a multi-dimensional table, a multi-dimensional matrix, a multi-dimensional array, and/or the like. For example, a RGB-CIE XYZ conversion may include a conversion transform 220 that may include a set of correction values in a 3×3 table entry format, with each table entry corresponding to a single correction value. For example, if the source color space is RGB (Red, Green, and Blue) and the intermediate color space is CIE XYZ (International Commission on Illumination XYZ), a CIE XYZ output color value 222 corresponding to an RGB input color value may be obtained at least in part by transforming the RGB input color value by conversion transform 220.

Output color values 222 may include output color values for multiple color channels. For example, if the output color values 222 are expressed in an intermediate device independent CIE XYZ (International Commission on Illumination XYZ) color space, output color values 222 may include an X-channel 224, a Y-channel 226, and a Z-channel 228. Alternatively, other examples of color channels for the output color values 222 may include other intermediate device independent color spaces, and/or device dependent destination color spaces such as L*a*b* (luminance, red/blue chrominance and yellow/blue chrominance), CMYK (Cyan, Magenta, Yellow and Black), and/or the like.

In one particular example, although claimed subject matter is not limited in this respect, conversion transform 220 may be associated with simulation transform 128. As will be described in greater detail below, in one particular example, although claimed subject matter is not limited in this respect, simulation transform 128 may be determined for use in simulating the appearance of a color image to a colorblind person. Such a simulation transform 128 may be incorporated into profile 210. For example, simulation transform 128 may be incorporated into a device-type profile 104 associated with destination device 100, incorporated into device-type profile 114 associated with source document 110, incorporated into document-type profile 124 associated with source document 110, incorporated into abstract-type profile 126, and/or the like. As illustrated here, profile 210 may comprise a device-type profile 114 associated with source document 110.

In operation, simulation transform 128 may translate color data 116 from a first color space to a second color space. Such a translation may comprise converting initial tristimulus color values, such as input color values 202, to resultant tristimulus color values, such as output color values 222, where resultant tristimulus color values 222 may be used to simulating the appearance of a color image to a colorblind person. Such a first color space may comprise a source device dependent color space and second color space may comprise a destination device dependent color space. For example, such a simulation transform may be associated with a device-type profile associated with a source device dependent color space and/or a device-type profile associated with a destination device dependent color space. Alternatively or additionally, the first color space may comprise a document dependent color space and the second color space may comprise a destination device dependent color space. For example, such a simulation transform may be associated with a document-type profile associated with a document dependent color space and/or a device-type profile associated with a destination device dependent color space. Alternatively or additionally, the first color space may comprise a device independent color space and the second color space may comprise a device independent color space. For example, such a simulation transform may be associated with an abstract-type profile associated with a device independent color space.

Input color values 202 may comprise initial tristimulus color values that may be trichromatic in appearance as well as providing three color channels of information. Simulation transform 128 may include a set of correction values that may translate initial tristimulus color values 202 into resultant tristimulus color values 222 that may be dichromatic in appearance while still providing three color channels of information. Such resultant tristimulus color values 222 may be utilized by destination device 100 to simulate a dichromatic appearance of color data 116 for presentment in output document 120. Conversely, an operation that would collapse color data 116 into bistimulus color values, as opposed to resultant tristimulus color values 222 that may be dichromatic in appearance, may not necessarily be compatible with destination device 100. For example, bistimulus color values may not be compatible with destination device 100 in cases where destination device 100 comprises a display monitor utilizing a RGB (Red, Green, and Blue) color space or a printer utilizing a CMYK (Cyan, Magenta, Yellow and Black) color space, for example.

During the conversion of initial tristimulus color values 202 to resultant tristimulus color values 222, color data 116 may be maintained in an unaltered state. Accordingly, a simulation of colorblindness may be made based, at least in part, on resultant tristimulus color values 222 without compromising color data 116.

Referring back to FIG. 1, in one particular example, one or more trichromatic images with a simulated dichromatic appearance 130 may be presented by destination device 100. For example, where destination device 100 comprises a display monitor, one or more simulated dichromatic images 130 may be displayed. Additionally or alternatively, one or more trichromatic images 132 may be presented without a simulated dichromatic appearance. For example, both simulated dichromatic image 130 and trichromatic image 132 may be simultaneously presented. In some instances, source document 110 may be presented without a simulated dichromatic appearance in a first window while source document 110 may also be presented with a simulated dichromatic appearance in a second window. For example, simulated dichromatic image 130 and trichromatic image 132 may be separated from one another. Alternatively, simulated dichromatic image 130 and trichromatic image 132 may be nested with respect to one another, such as, where simulated dichromatic image 130 may be presented in a preview window.

In one example, we can apply a process in a computing platform where after alteration of a profile, such as a device-type profile, with a simulation transform, an altered profile may be installed. A reboot of the computing platform may facilitate activation of the altered profile. Output documents 120 may then be printed and/or displayed with a visual distinction between simulated dichromatic images 130 and original trichromatic images 132, as will be described in greater detail below. In one or more embodiments, resulting image elements may be printed and/or displayed on a display monitor, for example, via a software program such as Adobe® Photoshop® type software, Adobe® Illustrator® type software, Adobe® Creative Suite® type software, Adobe® Premiere® Pro 2.0 type software, Adobe® Premiere® Elements type software, or Adobe® Acrobat® type software, or the like, available from Adobe Systems Incorporated of San Jose, Calif., USA. However, these are merely example types of software programs, and the scope of claimed subject matter is not limited in these respects.

Figure 3:
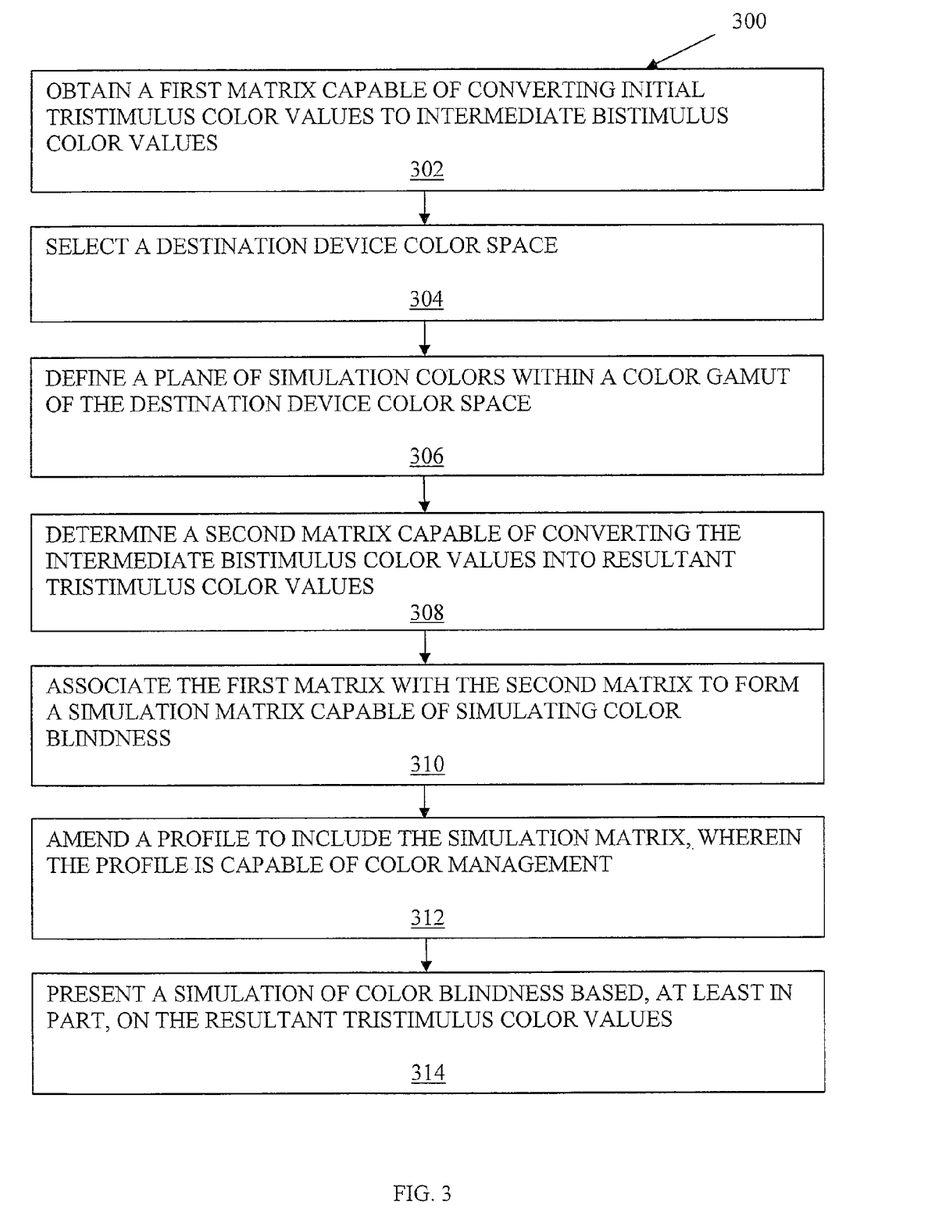
FIG. 3 is a flow diagram illustrating a procedure for determining a simulation transform in accordance with one or more embodiments.

Referring to FIG. 3, a flow diagram illustrates an example procedure in accordance with one or more embodiments, although the scope of claimed subject matter is not limited in this respect. Procedure 300 illustrated in FIG. 3 may be used to determine a simulation transform in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Procedure 300 depicted in FIG. 3 may in alternative embodiments be implemented in software, hardware, and/or firmware, and may comprise discrete operations. As illustrated, procedure 300 may be used to determine a simulation transform and to present a simulation of colorblindness based, at least in part, on the simulation transform. Procedure 300 may be used to determine a simulation transform starting at block 302 where a first transform may be obtained that may be capable of converting initial tristimulus color values to intermediate bistimulus color values. Such an operation may result in bistimulus color values that are dichromatic in nature. However, such bistimulus color values may not be well suited for common end uses. For example, display of color data typically utilizes tristimulus color values, not bistimulus color values. Such a first transform may comprise a two row by three column (2×3) matrix, for example. Such a (2×3) matrix may be determined by procedures set forth in more detail in Wyszecki, G. & Stiles, WS 1982 *Color science: concepts and methods quantitative data and formulae*. 2nd edn. New York: Wiley. However, this is merely an example of determining such a first transform, and the scope of claimed subject matter is not limited in this respect.

At block 304 a destination device color space may be selected. For example, Adobe® RGB may be selected as the destination device color space. However, this is merely an example, and the scope of claimed subject matter is not limited in this respect.

At block 306 a plane of simulation colors may be defined within a color gamut of the destination device color space. Such a plane of simulation colors may be defined for later use in mapping the bistimulus color values from the source color space to the selected destination device color space. Additionally, such a plane of simulation colors may be defined so as to be as large as possible while also ensuring the quality of colors, such as white, blue and/or yellow that may be likely to be perceived similarly by both dichromatic users as well as trichromatic users. For example, a plane of simulation colors may be defined within a color gamut of the destination device color space. Such a plane of simulation colors may be based, at least in part, on a black color value and two or more reference points selected at a periphery of the color gamut of the destination device color space. For example, such a plane of simulation colors may be based, at least in part, on a white color value and a second color value, wherein the second color value may be located at a periphery of the color gamut of the destination device color space. A white color value may be selected to define such a plane of simulation colors so as to ensure the quality of colors during later mapping with the plane of simulation colors. A second color value may be selected to define such a plane of simulation colors so as to increase the size of the plane of simulation colors within the selected destination device color space. In one example, where Adobe® RGB was selected as the destination device color space, a white color value of D50 may be selected, as D50 is the designated white point for one or more device independent color spaces, such as for a profile connection space of the International Color Consortium (ICC PCS). Similarly, a second color value of blue primary or yellow primary may be selected to increase the size of the plane of simulation colors within the selected destination device color space. It may be useful to designate a blue or a yellow color as the second color value, as these colors are likely to be perceived similarly by both dichromatic users as well as trichromatic users. For example, where Adobe® RGB was selected as the destination device color space, a second color value of blue primary in Adobe® RGB, that is chromatically adapted to D50 white, may be selected.

Alternatively, if a simulation transform has not been determined based on a white color value from a device independent color space, such as D50 from ICC PCS, such an alternative simulation transform may be adapted for use with a device independent color space. For example, such an alternative simulation transform may be adapted based, at least in part, on applying a first transform from a white color value of the alternative simulation transform to a white value of a device independent color space, and on applying a second transform from the white value of the device independent color space to the white color value of the alternative simulation transform. For example, the white color value of such an alternative simulation transform may comprise D65 white, while the white value of the device independent color space may comprise D50. In such a case, first transform may comprise a first white transform capable of a chromatic adaptation from D65 to D50 and second transform may comprise a second white transform capable of a chromatic adaptation from D50 to D65. A dot product of a first white transform, an alternative simulation transform, and a second white transform may form a simulation transform adapted for use with a device independent color space.

At block 308 a second transform may be determined that may be capable of converting the intermediate bistimulus color values into resultant tristimulus color values. Such an operation may result in a transform capable of converting bistimulus color values that are dichromatic in nature back into tristimulus color values while maintaining the dichromatic nature of the color values. Determining such a second transform may not comprise inverting the first transform. Instead, the intermediate bistimulus color values may be mapped to the plane of simulations colors based, at least in part, on the first transform. For example, the intermediate bistimulus color values may be mapped to the plane of simulations colors based, at least in part, on the first transform, the white color value, and the second color value. Based, at least in part, on such a mapping, a second transform may be determined that may be capable of converting the intermediate bistimulus color values into resultant tristimulus color values. For example, such a second transform may comprise a three row by two column (3×2) matrix. However, this is merely an example of a second transform, and the scope of claimed subject matter is not limited in this respect.

At block 310 the first transform may be associated with the second transform to form a simulation transform capable of simulating the appearance of a color image to a colorblind person. For example, the first transform and the second transform may be associated by taking a dot product of the first and second transforms. Based, at least in part, on such an association of the first and second transforms, a simulation transform capable of simulating the appearance of a color image to a colorblind person may be determined. Such a simulation transform may be capable of mapping initial tristimulus color values to resultant tristimulus color values to simulate a dichromatic appearance. Additionally or alternatively, such a mapping may result in resultant tristimulus color values that may be chromatically adapted and scaled based, at least in part, on a white color value utilized during the determination of the simulation transform.

At block 312 a profile capable of color management may be incorporated to include the simulation transform. As described above in greater detail, such a profile may comprise a device-type profile, a document-type profile, an abstract-type profile, and/or the like. For example, such a profile may comprise a device-type profile incorporated with a simulation transform. In such an instance, a conversion transform capable of converting between device dependent color values and device independent color values may be associated with the simulation transform. Such an association may comprise a dot product of a conversion transform and a simulation transform. Additionally or alternatively, such a conversion transform may be capable of converting from device dependent color values to device independent color values and/or capable of converting from device independent color values to device dependent color values. For example, a first device-type profile for a source device (such as device-type profile 114 illustrated in FIG. 1) may be incorporated with a simulation transform while a second device-type profile for a destination device (such as device-type profile 104 illustrated in FIG. 1) may be incorporated with a simulation transform. In such a case, either device-type profile 114 or device-type profile 104 may be utilized to convert initial tristimulus color values to resultant tristimulus color values capable of simulating the appearance of a color image to a colorblind person. Further, in situations where both device-type profile 114 and device-type profile 104 are utilized, device-type profile 114 may be utilized to convert initial tristimulus color values to resultant tristimulus color values capable of simulating the appearance of a color image to a colorblind person while device-type profile 104 will not further alter the simulation of colorblindness. Accordingly, a given simulation transform may be applied only once or multiple times via various profiles while resulting in the same simulation of colorblindness.

At block 314 present a simulation of colorblindness based, at least in part, on the resultant tristimulus color values. As discussed above with reference to FIG. 1, one or more trichromatic images with a simulated dichromatic appearance 130 may be presented by destination device 100 for display and/or for printing. Additionally or alternatively, one or more trichromatic images 132 may be presented without a simulated dichromatic appearance. For example, both simulated dichromatic image 130 and trichromatic image 132 may be simultaneously presented.

Figure 4:
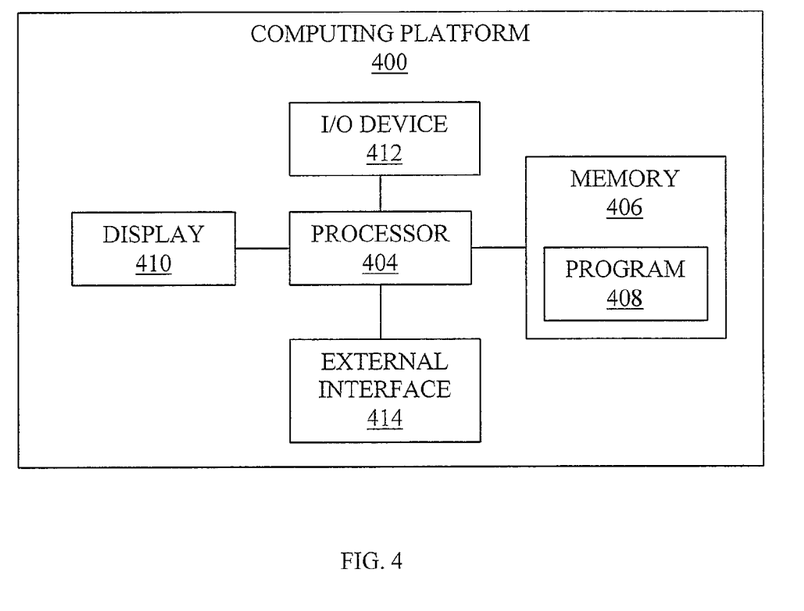
FIG. 4 is a schematic diagram of a computing platform in accordance with one or more embodiments.

FIG. 4 is a schematic diagram illustrating an exemplary embodiment of a computing environment system 400 that may include one or more devices configurable to simulate colorblindness using one or more techniques illustrated above, for example. System 400 may include, for example, a first device, a second device, and a third device, which may be operatively coupled together through a network.

Referring to FIG. 4, a block diagram illustrates a computing platform 400 according to one or more embodiments, although the scope of claimed subject matter is not limited in this respect. Computing platform 400 may include more and/or fewer components than those shown in FIG. 4. However, generally conventional components may not be shown, for example, a battery, a bus, and so on.

Computing platform 400, as shown in FIG. 4, may be utilized to tangibly embody a computer program and/or graphical user interface by providing hardware components on which the computer program and/or graphical user interface may be executed. Computing platform 400 may be utilized to tangibly embody all or a portion of procedure 300 of FIG. 3. In certain implementations, computing platform 400 may be configurable to colorblindness using one or more techniques illustrated above. For example, we can apply a process in computing platform 400 where after alteration of a profile with a simulation transform an altered profile may be installed. An output document may then be printed and/or displayed via computing platform 400 with a visual distinction between simulated dichromatic images and original trichromatic images, as described in greater detail above. In one or more embodiments, the image elements may be printed and/or displayed via a software program.

Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 4, computing platform 400 may be controlled by processor 404, including one or more auxiliary processors (not shown). Processor 404 may comprise a central processing unit such as a microprocessor or microcontroller for executing programs, performing data manipulations, and controlling the tasks of computing platform 400. Auxiliary processors may manage input/output, perform floating point mathematical operations, manage digital signals, perform fast execution of signal processing algorithms, operate as a back-end processor and/or a slave-type processor subordinate to processor 404, operate as an additional microprocessor and/or controller for dual and/or multiple processor systems, and/or operate as a coprocessor and/or additional processor. Such auxiliary processors may be discrete processors and/or may be arranged in the same package as processor 404, for example, in a multicore and/or multithreaded processor; however, the scope of claimed subject matter is not limited in these respects.

Communication with processor 404 may be implemented via a bus (not shown) for transferring information among the components of computing platform 400. A bus may include a data channel for facilitating information transfer between storage and other peripheral components of computing platform 400. A bus further may provide a set of signals utilized for communication with processor 404, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 400 may include, for example, memory 406, including one or more auxiliary memories (not shown). Memory 406 may provide storage of instructions and data for one or more programs 408 to be executed by processor 404, such as all or a portion of procedure 300 of FIG. 3, for example. Memory 406 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 406 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 406 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 400 further may include a display 410. Display 410 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 410 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 400 further may include one or more I/O devices 412. I/O device 412 may comprise one or more I/O devices 412 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 400 further may include an external interface 414. External interface 414 may comprise one or more controllers and/or adapters to prove interface functions between multiple I/O devices 412. For example, external interface 414 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 412.

It should also be understood that, although particular embodiments have just been described, the claimed subject matter is not limited in scope to a particular embodiment or implementation. For example, embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description above.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting; determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
   receiving a profile that includes a simulation transform capable of converting initial tristimulus color values into resultant tristimulus color values that simulate color blindness, wherein the profile is a color management profile associated with a first or a second color space;
   translating color data from the first color space to the second color space, said translating comprising using the simulation transform from the profile to convert the initial tristimulus color values to the resultant tristimulus color values, wherein the resultant tristimulus color values are capable of simulating the appearance of a color image to a colorblind person;
   maintaining the color data from the first color space in an unaltered state during said translation of color data; and
   presenting one or more trichromatic images on a display without a simulated dichromatic appearance based at least in part on the initial tristimulus color values while presenting one or more trichromatic images on the display with a simulated dichromatic appearance based at least in part on the resultant tristimulus color values.

2. The method of claim 1, wherein the first color space comprises a source device dependent color space and the second color space comprises a destination device dependent color space.

3. The method of claim 1, wherein the profile is a device-type profile that is associated with the first color space or the second color space.

4. The method of claim 1, wherein the first color space comprises a document dependent color space and the second color space comprises a destination device dependent color space.

5. The method of claim 1, wherein the profile is a document-type profile associated with the first color space.

6. The method of claim 1, wherein the first color space comprises a device independent color space and the second color space comprises a device independent color space.

7. The method of claim 1, wherein the profile is an abstract-type profile associated with the first color space.

8. A method, comprising:
   determining a simulation transform capable of simulating colorblindness, comprising:
      receiving a first transform capable of converting initial tristimulus color values to intermediate bistimulus color values,
      determining a second transform capable of converting the intermediate bistimulus color values into resultant tristimulus color values, and
      associating the first transform with the second transform; and
   incorporating the simulation transform as part of a profile, wherein the profile is a color management profile associated with a first or a second color space, wherein the profile is capable of converting initial tristimulus color values to the resultant tristimulus color values to subsequently simulate colorblindness.

9. The method of claim 8, further comprising presenting a simulation of colorblindness based, at least in part, on the resultant tristimulus color values.

10. The method of claim 8, wherein determining a second transform further comprises:
    selecting a destination device color space;
    defining a plane of simulation colors within a color gamut of the destination device color space; and
    mapping the intermediate bistimulus color values to the plane of simulation colors based, at least in part, on the first transform.

11. The method of claim 8, wherein determining a second transform further comprises:
    selecting a destination device color space;
    defining a plane of simulation colors within a color gamut of the destination device color space based, at least in part, on selecting a white color value and another color value, wherein the another color value is located at a periphery of the color gamut of the destination device color space; and
    mapping the intermediate bistimulus color values to the plane of simulations colors based, at least in part, on the first transform, the white color value, and the another color value.

12. The method of claim 8, wherein the profile comprises a device-type profile, and wherein said incorporating comprises associating a conversion transform capable of converting between device dependent color values and device independent color values with the simulation transform.

13. The method of claim 8, wherein the profile comprises a device-type profile, and wherein said incorporating comprises associating a conversion transform capable of converting from device dependent color values to device independent color values with the simulation transform.

14. The method of claim 8, wherein the profile comprises a device-type profile, and wherein said incorporating comprises associating a conversion transform capable of converting from device independent color values to device dependent color values with the simulation transform.

15. The method of claim 8, wherein the profile comprises a document-type profile.

16. The method of claim 8, wherein the profile comprises an abstract-type profile.

17. An article, comprising:
a non-transitory storage medium having stored thereon machine-readable instructions that, if executed, direct a computing platform to:
determine a simulation transform capable of simulating colorblindness, comprising:
receiving a first transform capable of converting initial tristimulus color values to intermediate bistimulus color values,
determining a second transform capable of converting the intermediate bistimulus color values into resultant tristimulus color values, and
associating the first transform with the second transform; and
incorporate the simulation transform as part of a profile, wherein the profile is a color management profile associated with a first or a second color space, wherein the profile is capable of converting initial tristimulus color values to the resultant tristimulus color values to subsequently simulate colorblindness.

18. The article of claim 17, wherein said machine-readable instructions, if executed, further direct a computing platform to: present a simulation of colorblindness based, at least in part, on the resultant tristimulus color values.

19. The article of claim 17, wherein said determining the second transform comprises:
selecting a destination device color space;
defining a plane of simulation colors within a color gamut of the destination device color space; and
mapping the intermediate bistimulus color values to the plane of simulation colors based, at least in part, on the first transform.

20. The article of claim 17, wherein said determining the second transform comprises:
selecting a destination device color space;
defining a plane of simulation colors within a color gamut of the destination device color space based, at least in part, on a selection of a white color value and another color value, wherein the another color value is located at a periphery of the color gamut of the destination device color space; and
mapping the intermediate bistimulus color values to the plane of simulations colors based, at least in part, on the first transform, the white color value, and the another color value.

21. An apparatus, comprising:
a computing platform, said computing platform being adapted to:
determine a simulation transform capable of simulating colorblindness, comprising:
receiving a first transform capable of converting initial tristimulus color values to intermediate bistimulus color values,
determining a second transform capable of converting the intermediate bistimulus color values into resultant tristimulus color values, and
associating the first transform with the second transform; and
incorporate the simulation transform as part of a profile, wherein the profile is a color management profile associated with a first or a second color space, wherein the profile is capable of converting initial tristimulus color values to the resultant tristimulus color values to subsequently simulate colorblindness.

22. The apparatus of claim 21, wherein said computing platform is further adapted to: present a simulation of colorblindness based, at least in part, on the resultant tristimulus color values.

23. The apparatus of claim 21, wherein the operation to determine a second transform further comprises:
select a destination device color space;
define a plane of simulation colors within a color gamut of the destination device color space; and
map the intermediate bistimulus color values to the plane of simulation colors based, at least in part, on the first transform.

24. An apparatus, comprising:
means for receiving a profile that includes a simulation transform capable of converting initial tristimulus color values into resultant tristimulus color values that simulate color blindness, wherein the profile is a color management profile associated with a first or a second color space;
means for translating color data from the first color space to the second color space, said means for translating comprising means for converting initial tristimulus color values to resultant tristimulus color values by using the simulation transform from the profile, wherein the resultant tristimulus color values are capable of simulating the appearance of a color image to a colorblind person;
means for maintaining the color data from the first color space in a unaltered state during said translation of color data; and
means for presenting one or more trichromatic images on a display without a simulated dichromatic appearance while presenting one or more trichromatic images on the display with a simulated dichromatic appearance, wherein the one or more trichromatic images with a simulated dichromatic appearance are based, at least in part, on the resultant tristimulus color values.

25. The apparatus of claim 24, wherein the profile is a device-type profile that is associated with the first color space or the second color space.

* * * * *